(12) United States Patent
Hernandez-Abrego et al.

(10) Patent No.: US 9,405,363 B2
(45) Date of Patent: Aug. 2, 2016

(54) AUDIO, VIDEO, SIMULATION, AND USER INTERFACE PARADIGMS

(71) Applicant: Sony Computer Entertainment Inc., Tokyo (JP)

(72) Inventors: Gustavo Hernandez-Abrego, Mountain View, CA (US); Xavier Menendez-Pidal, Los Gatos, CA (US); Steven Osman, San Francisco, CA (US); Ruxin Chen, Redwood, CA (US); Rishi Deshpande, Mountain View, CA (US); Care Michaud-Wideman, San Mateo, CA (US); Richard Marks, Foster City, CA (US); Eric J. Larsen, Foster City, CA (US); Xiaodong Mao, Foster City, CA (US)

(73) Assignee: SONY INTERACTIVE ENTERTAINMENT INC. (SIEI), Tokyo (JP)

( * ) Notice: Subject to any disclaimer, the term of this patent is extended or adjusted under 35 U.S.C. 154(b) by 94 days.

(21) Appl. No.: 14/459,248

(22) Filed: Aug. 13, 2014

(65) Prior Publication Data
US 2014/0347272 A1 Nov. 27, 2014

Related U.S. Application Data

(63) Continuation of application No. 11/522,304, filed on Sep. 15, 2006, now Pat. No. 8,825,482.

(60) Provisional application No. 60/718,145, filed on Sep. 15, 2005.

(51) Int. Cl.
*G06F 3/01* (2006.01)
*G10L 17/04* (2013.01)
(Continued)

(52) U.S. Cl.
CPC .............. *G06F 3/012* (2013.01); *A63F 13/213* (2014.09); *A63F 13/217* (2014.09); *G06F 3/015* (2013.01); *G10L 17/005* (2013.01); *G10L 17/04* (2013.01); *G06F 2203/011* (2013.01)

(58) Field of Classification Search
CPC . G06K 9/00248; G06F 3/013; H04L 12/1831
USPC .............................. 345/156; 386/219; 725/10
See application file for complete search history.

(56) References Cited

U.S. PATENT DOCUMENTS

| 5,226,084 A | 7/1993 | Hardwick et al. |
| 5,659,662 A | 8/1997 | Wilcox et al. |

(Continued)

OTHER PUBLICATIONS

Chin-Hui Lee et al., "Speaker Adaptation Based on MAP Estimation of HMM Parameters", 1993, IEEE, p. 558-561.
(Continued)

*Primary Examiner* — Douglas Godbold
*Assistant Examiner* — Mark Villena
(74) *Attorney, Agent, or Firm* — Kilpatrick Townsend & Stockton LLP

(57) ABSTRACT

Consumer electronic devices have been developed with enormous information processing capabilities, high quality audio and video outputs, large amounts of memory, and may also include wired and/or wireless networking capabilities. Additionally, relatively unsophisticated and inexpensive sensors, such as microphones, video camera, GPS or other position sensors, when coupled with devices having these enhanced capabilities, can be used to detect subtle features about users and their environments. A variety of audio, video, simulation and user interface paradigms have been developed to utilize the enhanced capabilities of these devices. These paradigms can be used separately or together in any combination. One paradigm automatically creating user identities using speaker identification. Another paradigm includes a control button with 3-axis pressure sensitivity for use with game controllers and other input devices.

17 Claims, 11 Drawing Sheets

(51) Int. Cl.
*A63F 13/213* (2014.01)
*A63F 13/217* (2014.01)
*G10L 17/00* (2013.01)

(56) References Cited

U.S. PATENT DOCUMENTS

| | | | |
|---|---|---|---|
| 5,835,890 | A | 11/1998 | Matsui et al. |
| 6,243,669 | B1 | 6/2001 | Horiguchi et al. |
| 6,400,996 | B1 | 6/2002 | Hoffberg |
| 6,442,519 | B1 | 8/2002 | Kanevsky et al. |
| 6,456,973 | B1 | 9/2002 | Fado et al. |
| 6,697,778 | B1 | 2/2004 | Kuhn et al. |
| 6,804,647 | B1 | 10/2004 | Heck et al. |
| 6,950,798 | B1 | 9/2005 | Beutnagel et al. |
| 7,016,837 | B2 | 3/2006 | Seo et al. |
| 7,106,313 | B2 | 9/2006 | Schena et al. |
| 7,762,665 | B2 | 7/2010 | Vertegaal et al. |
| 8,096,660 | B2 | 1/2012 | Vertegaal et al. |
| 8,196,168 | B1* | 6/2012 | Bryan .................. G11B 27/002 725/134 |
| 8,322,856 | B2 | 12/2012 | Vertegaal et al. |
| 2002/0135618 | A1* | 9/2002 | Maes .................... G06F 3/0481 715/767 |
| 2003/0061050 | A1 | 3/2003 | Tosaya |
| 2003/0123754 | A1* | 7/2003 | Toyama ............. G06K 9/00228 382/291 |
| 2003/0171190 | A1 | 9/2003 | Rice |
| 2003/0220791 | A1 | 11/2003 | Toyama |
| 2004/0088162 | A1 | 5/2004 | He et al. |
| 2004/0193413 | A1 | 9/2004 | Wilson |
| 2004/0230420 | A1 | 11/2004 | Kadambe |
| 2004/0260546 | A1 | 12/2004 | Seo |
| 2005/0004496 | A1* | 1/2005 | Pilu ........................ H04N 5/232 600/595 |
| 2005/0041951 | A1* | 2/2005 | Inoue ................... G11B 27/326 386/219 |
| 2005/0074148 | A1* | 4/2005 | Rodyushkin ....... G06K 9/00248 382/118 |
| 2005/0198661 | A1* | 9/2005 | Collins ................... G09F 27/00 725/19 |
| 2005/0228641 | A1 | 10/2005 | Chelba et al. |
| 2006/0111904 | A1 | 5/2006 | Wasserblat |
| 2006/0206332 | A1 | 9/2006 | Paek et al. |
| 2006/0267781 | A1* | 11/2006 | Coulter ................ B60K 28/066 340/573.7 |
| 2007/0150916 | A1* | 6/2007 | Begole .................. H04H 60/31 725/10 |
| 2007/0164990 | A1* | 7/2007 | Bjorklund ............... G06F 3/017 345/156 |
| 2007/0294082 | A1 | 12/2007 | Jouvet et al. |
| 2008/0208581 | A1 | 8/2008 | Pelecanos et al. |
| 2013/0124623 | A1* | 5/2013 | Munter ................. H04L 65/403 709/204 |

OTHER PUBLICATIONS

Don McAllaster et al., "Studies in Acoustic Training and Language Modeling Using Simulated Speech Data", Dragon Systems, Inc., 1999.
Roland Kuhn et al., "Rapid Speaker Adaptation in Eigenvoice Space", Nov. 2000, IEEE, pp. 695-707.
Shigeki Sagayama et al., "Jacobian Approach to Fast Acoustic Model Adaptation", NTT Human Interface Laboratories, 1997 IEEE.

\* cited by examiner

AUDIO, VIDEO, SIMULATION, AND USER INTERFACE PARADIGMS

CROSS-REFERENCES TO RELATED APPLICATIONS

This application is a continuation of U.S. patent application Ser. No. 11/522,304, filed Sep. 15, 2006, which claims the benefit under 35 USC 119(e) of U.S. Provisional Patent Application No. 60/718,145, filed Sep. 15, 2005, entitled "Audio, Video, Simulation, and User Interface Paradigms," the above applications being incorporated herein by reference in their entireties for all purposes.

BACKGROUND

The capabilities of portable or home video game consoles, portable or desktop personal computers, set-top boxes, audio or video consumer devices, personal digital assistants, mobile telephones, media servers, and personal audio and/or video players and recorders, and other types of electronic devices are increasing dramatically. The devices can have enormous information processing capabilities, high quality audio and video outputs, large amounts of memory, and may also include wired and/or wireless networking capabilities. Additionally, relatively unsophisticated and inexpensive sensors, such as microphones, video camera, GPS or other position sensors, when coupled with devices having these enhanced capabilities, can be used to detect subtle features about users and their environments.

It is therefore desirable to develop new paradigms for audio, video, simulation techniques, and user interfaces that harness these enhanced capabilities.

BRIEF SUMMARY

Consumer electronic devices have been developed with enormous information processing capabilities, high quality audio and video outputs, large amounts of memory, and may also include wired and/or wireless networking capabilities. Additionally, relatively unsophisticated and inexpensive sensors, such as microphones, video camera, GPS or other position sensors, when coupled with devices having these enhanced capabilities, can be used to detect subtle features about users and their environments. A variety of audio, video, simulation and user interface paradigms have been developed to utilize the enhanced capabilities of these devices. These paradigms can be used separately or together in any combination. One paradigm automatically creating user identities using speaker identification. Another paradigm includes a control button with 3-axis pressure sensitivity for use with game controllers and other input devices.

In an embodiment, a method for automatically creating user identities using speaker identification includes receiving first speech input data from one or more users, determining speaker-dependent speech characteristics for the first speech input data, applying the speaker-dependent speech characteristics to a generic acoustic model of speaker identity to produce at least one acoustic model of a specific speaker, and defining a user identity for each acoustic model of a specific speaker. In a further embodiment, the method also includes receiving second speech input data from an unknown user, evaluating the second speech input data with at least one of the acoustic models, and associating the unknown user with a selected one of the user identities corresponding with one of the acoustic models in response to the evaluation. In another embodiment, the method also includes applying configuration settings associated with the selected user identity.

In an additional embodiment, an input device includes a first control button, a first pressure sensor coupled with the first control button and adapted to provide a first control signal in response to pressure along a first axis, a second pressure sensor coupled with the first control button and adapted to provide a second control signal in response to pressure along a second axis, a third pressure sensor coupled with the first control button and adapted to provide a third control signal in response to pressure along a third axis, and a data communications interface adapted to provide the first, second, and third control signals to a game console. In a further embodiment, the input device includes a control stick adapted to provide a proportional control signal in response to user input along the first and second axes. In still another embodiment, the input device includes a wireless data communications interface. In yet a further embodiment, the first, second, and third control signals are proportional to the amount of pressure detected along the associated first, second, and third axes.

BRIEF DESCRIPTION OF THE DRAWINGS

The invention will be described with reference to the drawings, in which.

DETAILED DESCRIPTION

Figure 1:
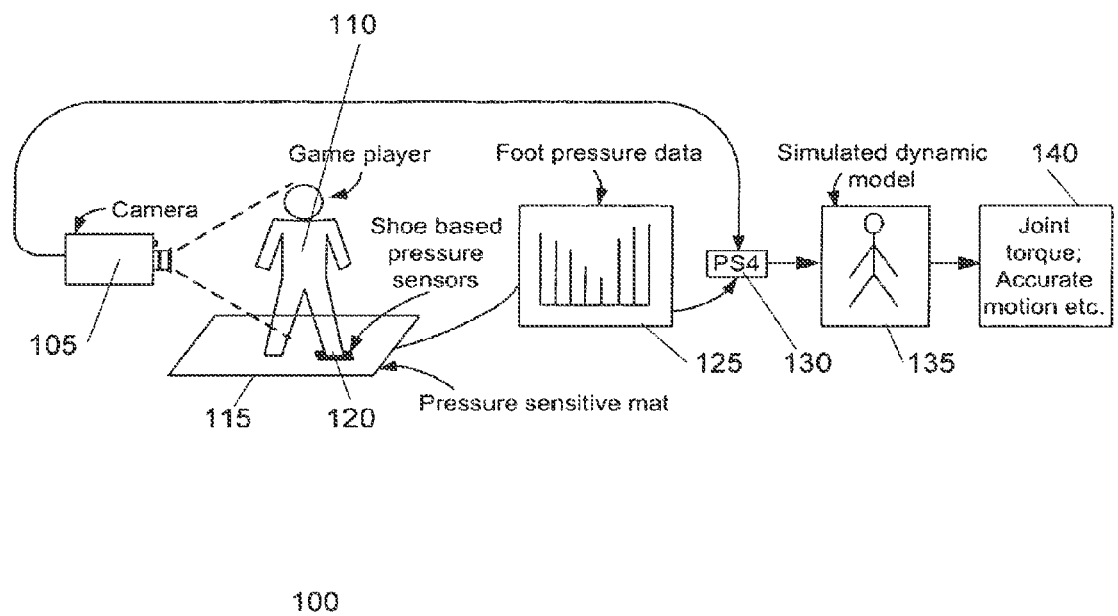
FIG. 1 illustrates a dynamic kinematic animation system according to an embodiment of the invention.

A variety of audio, video, simulation and user interface paradigms have been developed to utilize the enhanced capabilities of these devices. These paradigms can be used separately or together in any combination by portable or home video game consoles, portable or desktop personal computers, set-top boxes, audio or video consumer devices, personal digital assistants, mobile telephones, media servers, and personal audio and/or video players and recorders, and other types of electronic devices.

Using Sound to Command Game Consoles

An embodiment of the invention uses sound to command game consoles in addition to or instead of a game pad or other input device. For example, a hand clap, a punch on same material, say a word of yelling or voice, the sound is language independent, person independent or dependent. If it is person dependent, a special ID is applied first. Only the authorized person's sound passing through for further recognition and detection. If it detects target sound, the system will look up command list to act accordingly, such as entering/exiting power saving mode or pause/active game play etc.

An embodiment detects sound by either zero-crossing rate energy bused threshold or in frequency-domain. If sound has harmonies and pitch continuously recognize sound can be done through DTW (Dynamic Time Warping). It's isolated word style or more simpler by mean-clustering or Grausstemmature-modelling.

Automatic and Dynamic Audio Mixing

Video games and other forms of digital entertainment often use key audio sequences to convey important elements of the story. Unfortunately, these important cues can be lost if the volume controls are set too low, or if there is much ambient noise in the background. This is particularly true of action movies and/or video games that quickly and often transition between loud explosive sounds and softer dialogue, causing the user to drastically lower the volume.

Currently, resolving such problems is an inefficient, manual process, and often not quite enough to capture the key audio sequences. Specifically, the designer/director/producer statically adjusts the audio levels, and the user is responsible (and expected) to ensure the volume is large enough at key times.

In an embodiment, a system can be created that combines three elements to solve this problem. First, a microphone can be embedded in the output device (VCR/DVD player, video game console, etc.). Second, the audio tracks/sequences can be annotated to indicate important/"must hear" sequences. Finally, the output device can monitor the ambient noise levels through the microphone to ensure that the volume at which the "must hear" sequences and played back is sufficiently had to be understandable. This could be a continuous process to determine that the "must hear" sequence is sufficiently loud compared to the ambient noise by analyzing the audio signal from the microphone as the sequence plays.

Audio-Based Remote Input Devices

Even though there are many ways a video game system can receive input from controllers/input devices, most often they use electrical signal through cables, infra red signals, or wireless radio signals to do so. These devices suffer from many problems, including lack of durability, the use of batteries which can fail, the use of cords, and are typically somewhat delicate, for example, not able to withstand water spills. Most importantly, these devices are costly to produce.

An embodiment assumes a video game system has a built-in microphone opens up the possibility of audio signals to provide a mechanism for input devices to communicate to the system.

In an embodiment, cheap disposable input devices can be easily made so that pressing a button or trigger, or blowing air into them produces a specific audio profile. These passive devices can be made cheaply enough and light enough that they could be included, for instance, in a cereal box. Video games can use the distinct profile produced by the device to perform a common function (e.g., shoot or jump), or unlocking a secret (e.g., opening a magic door or providing a secret weapon). In the latter case, the production quantity can be controlled to make these items collectable.

A method that combines an in-console microphone with such a class of devices can be used to allow interactive control of video games. The video game system can continually monitor the microphone's signal to find the profiles produced by the devices through simple acoustic analysis. Once a specific profile associated with one of these services has been identified, the signal can trigger an event within the game, which causes an in-game reaction previously assigned by the game designer.

Auto Calibration of Audio Environment Using System Metrics

People set up their speakers and amplifiers according to their room needs. To get good audio behavior, it requires adjustment for position and power and quality of speakers. Many people do not bother or do not know how to adjust.

An embodiment of the invention strives for easy, automatic, good sound calibration that matches designer intent.

An embodiment uses a game system or other device with a built-in microphone, rich sound generating device, and processing power to generate reference audio for matching and adjustment. This reference audio could be designed for easy matching or for direct mapping to controllable audio parameters. In an embodiment, the audio adjustment parameters could be stored in the game system flash memory and automatically applied to all sound output. An embodiment of the system could recommend manual adjustments so that all sound output will be improved (music, movies, games, etc.).

Position-Tracking Using Microphone Arrays

An embodiment of the invention uses a device composed of a GPS and/or a microphone arrays on a game controller, or a GPS and a speaker, producing audible or ultra-sonic output, on a game controller with microphone arrays connected to the game console or game server.

The game controller could be wired or wireless connected to game console or game server. GPS system will be able to pick up the course location of the game controller, says with an accuracy of 10 meters.

In an embodiment, the speaker and microphone array combination, regardless of whether the speaker is on the controller and the microphone array is on the game console or other device, or vice-versa, will be able to pinpoint the location of the controller to several to 10 centimeter level.

By using such a device, the system will be able to accurately locate the position of the game player.

1. In one of the applications, a game player will be able to treat the game controller as a virtual object in the game. The game player will be able to hold the object and move it physically in the real world and have a corresponding virtual object inside the game mirror these movements effect.

2. In another kind of application, where there are three-dimensional placement of microphone array, the game player will be able to control the orientation and position of the virtual object by manipulating the controller or other physical object in a similar manner, with a combination of the button push to have a 3-D effect of firing a powerful weapon, a missile, etc.

3. In case there is a pulse of ultrasonic sound present, the system will not only be able to allocate the position of the controller. The system will also be able to detect if present of object in the current game environment. (Just like a bat.)

Another example of the use of such information is to map the present real world into the fake virtual world and map the real present object into exotic virtual object. These method will provide more interesting virtual world experience.

4. In case of a geo-caching or scavenger hunts kind of applications, GPS will provide the position good enough to identify "hot spot." Microphone arrays and spoken near the "hot spot" will be able to check if a game player find the "virtual treasure" or "buried box."

Game Pad Buttons with 3 Axis of Pressure Sensitivity

An embodiment of the invention includes a new class of button style inputs for use in hand based video game input devices which leverages existing technology to detect 3 axis of pressure sensitivity. These buttons would be used in place of or in conjunction with in place of the traditional action buttons (i.e., Δ☐OX) on device such as the Wavebird, Dualshock 1&2 and the X-Box controller which are either only digital or 1 axis analog sensors. These sensors are static NOBS which can recognize analog pressure from left and right ($x_1$–x) forward and back ($y_1$–y) up and down (z, –z). This leads to robust analog input in three axes.

Current digital buttons are severely limited input mechanisms and the single axis analog buttons are underutilized (most users are unaware of this functionality) and they don't have enough fidelity to impart subtle control. Thus when possible, people tend to use analog sticks. As a result, with single axis buttons, most gameplay skews to full pressure being best pressure, at which point the buttons might as well be digital, rather than analog, input devices. Three axis of analog control would allow for complex input even with poor fidelity.

Imagine a tennis game: digital button-only imports if user swings or not, single axis analog—allows for one type of swing with varying levels of power, 3 axis analog—allows for swing strength, for all swing types and at least 4 additional controls to be used for spin (English) or stroke type (forehand, backhand, lob, spike). The argument for 3 axis buttons (over single analog or digital) is directly analogues to the argument for analog sticks over "D-Pad."

To implement these new "buttons" apply existing technology from aerospace. Replace current action buttons and provide appropriate drivers to allow developers to leverage up to 3 axis of control. Would suggest visually differentiating from current family of gamepad buttons so it doesn't suffer from user oversight as current analog buttons have.

Figure 8:
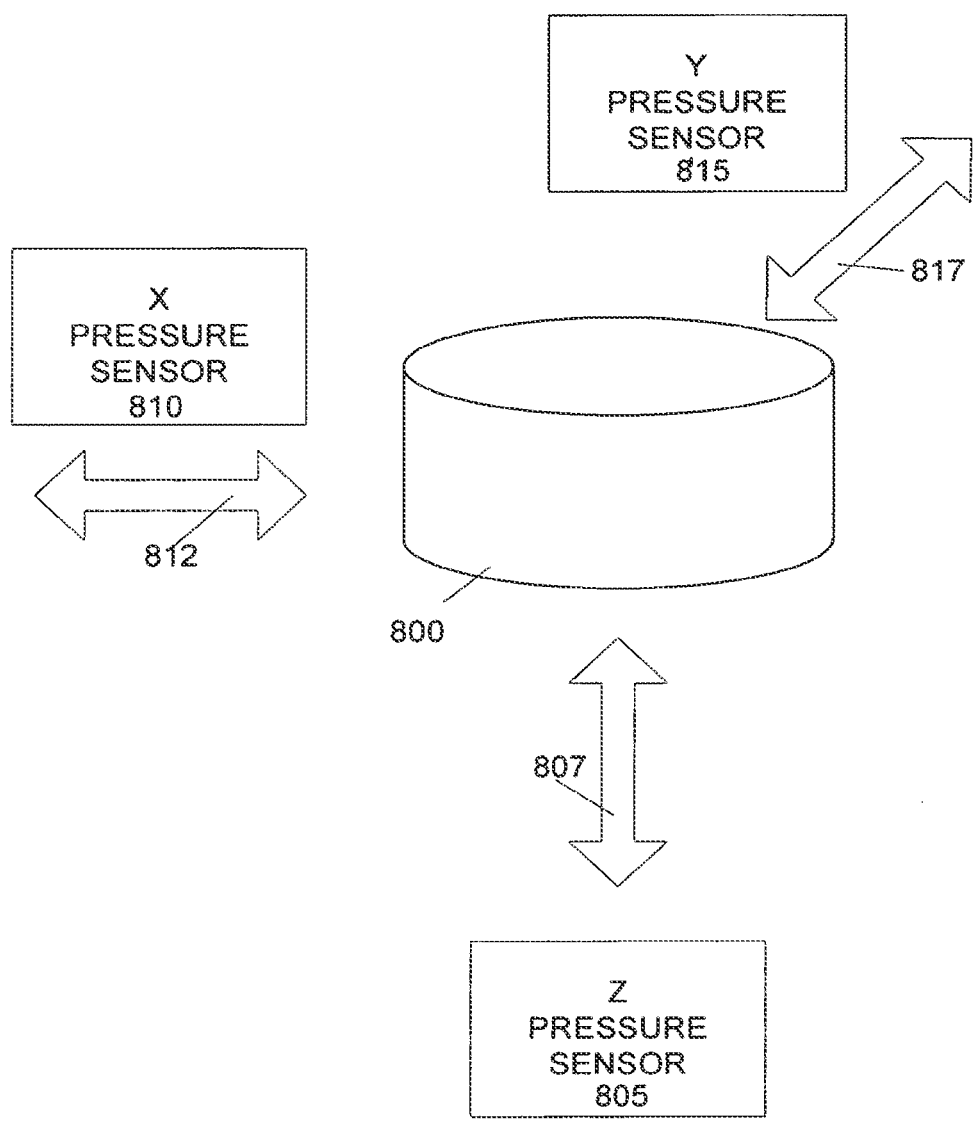
FIG. 8 illustrates an example control button with 3-axis pressure sensitivity according to an embodiment of the invention.

FIG. 8 illustrates an example button 800 with 3-axis of pressure sensitivity according to an embodiment of the invention. Button 800 is connected with X-axis pressure sensor 810, Y-axis pressure sensor 815, and Z-axis pressure sensor 805. Motion or pressure along the X-axis 812 is detected by sensor 810, along the Y-axis 817 is detected by sensor 815, and the Z-axis 807 is detected by sensor 805.

Background Audio to Enhance Online Gaming Experiences

An embodiment of the invention includes s method to enhance online gaming by mixing remote partner's background sound with game character. A game console equipped with a microphone can continuously gather local background sound. A microphone array can do can selectively gathering sound based on predefined listening area. For example, one can define ±20° cone or other region of microphone focus. Anything outside this cone would be considered as background sound. Audio processing can robustly subtract background from foreground gamer's voice. We can mix the background sound with the pre-recorded voice of game character that is currently speaking. This newly mixed sound signal is transferred to remote partner, such another game player over a network. Similarly, the same method is applied to the remote side as well, so that the local player is presented with background audio from the remote partner. This can enhance the gaming reality experience comparing with real world.

An embodiment records background sound, as said with a microphone array, which is rather straight forward either with the microphone-array's select listening ability or with one single microphone. A voice activity detection (VAD) should be used to discriminate a player's voice from background. Once VAD is detected, the previous silence signal is used to replace the background.

Automatic Adjustment of Audio and Video Settings Based on User Position

Many video displays or audio degrade when the user is not in the "sweet spot." Since it is not known where the user is, the previous best approach is to widen the sweet spot as much as possible. An embodiment of the invention proposes that by knowing where the user is, it can adjust display or audio parameters to move the sweet spot.

An embodiment of the invention detects where the user is using head detection and tracking with a camera. Then, we can change the LCD angle or other electronic parameters to improve display quality dynamically. For audio, phase and amplitude of each channel could be adjusted to adjust sweet spot. The key is having head or user position tracking via a video camera and/or microphone input.

Dynamic Kinematic Character Animation

Current video-only-based technology for capturing a game player's movements severely limit the fidelity of the resulting motion as it is unable to capture subtleties in motion such as shifting weight from leg to leg, crouching in anticipation for a jump, determining the exact time a foot leaves the ground, etc.

An embodiment of the invention includes a method for using foot pressure data acquired in real-time. By using either shoe-based pressure sensors or a stationary hi-res, pressure sensitive mat and combining it with kinematic data acquired via video input, the fidelity of the captured motion is improved. In addition this technique will provide useful information about the biomechanics of the motion, such as muscle activation, joint stress levels, lower back stress, etc.

In an embodiment, this method is feeds the foot pressure data acquired from the pressure sensors to an accurate dynamical model of the character, simulated in real time on the console/computer. Knowing the resulting limb motion (from the camera input) as well as the external forces acting in the body (gravity and ground reaction forces), and pressure inputs, an embodiment is able to predict the joint torques-required to achieve the motion. This will not only provide us with this novel piece of information that would be otherwise impossible to capture only using the video input, it will also help validate the video input, disambiguating video captured motion (e.g. ambiguities resulting from limbs being occluded by each other or the body, etc.).

FIG. 1 illustrates a dynamic kinematic animation system 100 according to an embodiment of the invention. System 100 acquires and utilizes video and foot pressure data as described above to manipulate a simulated dynamic model of the player or of a character. System 100 includes a camera 105 for capturing video data of a game player 110. Additionally, foot pressure data 125 from the game player 110 is acquired via shoe based pressure sensors 120 or a pressure sensitive mat 115 located underneath the game player 110.

The video data and foot pressure data 125 is communicated with a game console, computer system, or other information processing device 130. Game console 130 analyzes the video and foot pressure data 125 in conjunction with a simulated dynamic model 135 of the game player 110 or a game character. The simulated dynamic model 135 provides motion data 140 such as joint torque or accurate motion of the game player 110.

Video Augmented Speech Recognition

An embodiment includes a method to use video input device in conjunction with a microphone in an entertainment/ game device to help speech recognition performance, or to help language learning and visual object identification.

One example of the use of the method is when a lot of cars are spotted through video input signal, all those cars' brand names will be put into speech recognition active vocabulary. This will reduce the out-of-vocabulary chance of the word spoken by the player.

Another example of the use of this invention, is when a player picks up a (virtual or real) object and says a short phrase or a word, the system will assume there is a connection between the object and the speech. When there is an enough number of repetitions of such an association, the system with consider the particular object is named as the recorded sound. This process will enable entertaining learning.

Another example of the use of the method is when the player is making a particular gesture, say, pointing to the left. If in the top 10 recognition result there is only one result containing the word left but this result is not the most likely result from the speech recognition algorithm alone, the result the containing the word "left" will be chosen as the most likely output due to the additional information provided by the video input.

Another example of the use of the method is when the video input could identify the player is in a sport stadium. Then the active vocabulary and grammar for speech recognition will be tuned more toward sport theme.

Speech Recognition in dictation mode will generate nouns. The object referred by these nouns can be used to help identify objects in the video input.

A Method To Do Fast Adaptation of Acoustic Model Using a Production Model of the Target Speaker Acoustic model adaptation requires a lot of data to estimate reliable statistics. The slow rate of adoption is a technical problem and it is desirable to obtain accurate speech recognition without extensive adaptation time. In an embodiment, we propose to use a simulation production model of the target speaker to generate a sample set of artificial speech data. The sample set of artificial speech data is used to adapt the acoustic model off line, without the need for additional data from the user. Estimation of the production model of a speaker requires less data from the speaker then training speech recognition, but is computation expensive and is very accurate.

Figure 2:
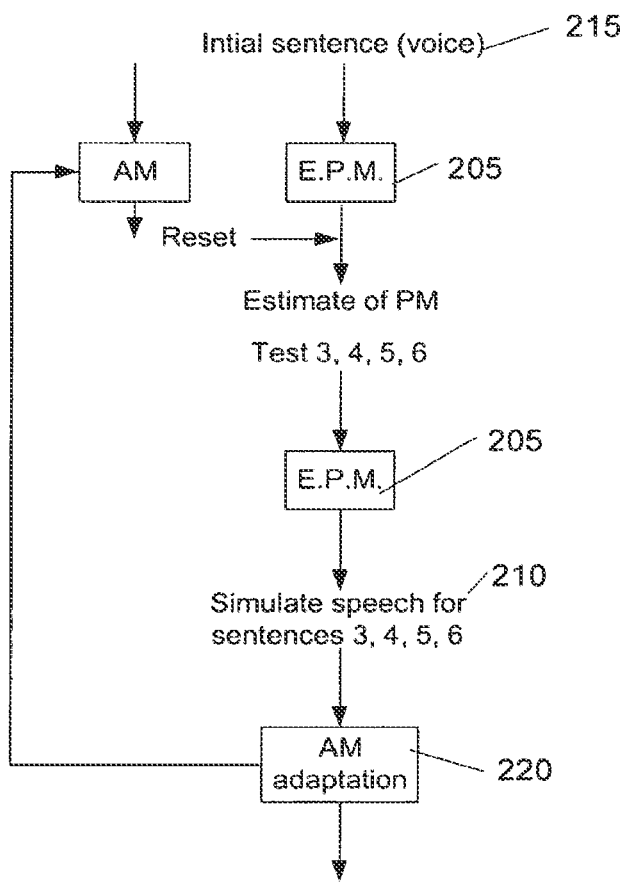
FIG. 2 illustrates a system for adapting a speech recognition model using a model of a target speaker according to an embodiment of the invention.

FIG. 2 illustrates a system 200 for adapting a speech recognition model using a model of a target speaker according to an embodiment of the invention. System 200 receives initial speech data in the form of sentences 215 from a user, referred to as a speaker. The system 200 builds an estimated production model 205 from the initial speech data 215. The estimated production model 205 simulates the specific speech characteristics of the speaker. Once the estimated production model 205 closely simulates the speech characteristics of a specific user, the system 200 uses the estimated production model 205 to generate additional speech data 210. In this embodiment, the additional speech data 210 is generated entirely by the estimated production model 205 and does not require the speaker to input additional speech to system 200.

The additional speech data 210 is used to develop an acoustic model 210 for speech recognition of the user's speech. In an embodiment, the additional speech data 205 is provided to an acoustic model adaptation module 220 to refine acoustic model 225. In this embodiment, the acoustic model's speech recognition abilities are refined in part using the simulated speech data produced by the production model 205, rather than actual speech input from the user. These steps can be done iteratively until convergence. The output is an adopted acoustic node tuned for a specific speaker using simulated speech generated off line artificially rather than requiring the speaker to dictate long passages to train the acoustic model.

Figure 3:
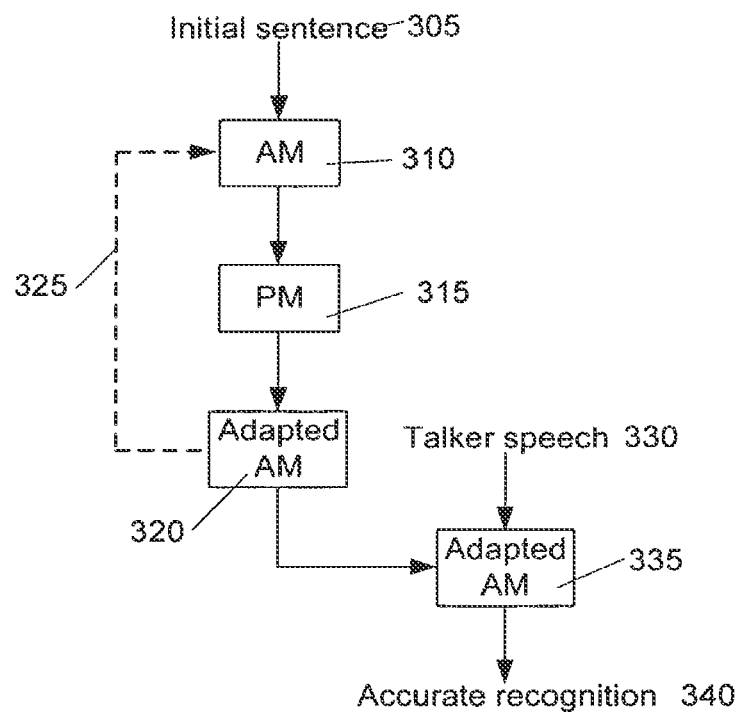
FIG. 3 illustrates a system for adapting a speech recognition model using a model of a target speaker according to an embodiment of the invention.

FIG. 3 illustrates a system 300 for adapting a speech recognition model using a model of a target speaker according to an embodiment of the invention. System 300 receives initial speech input 305 from a user. The speech input 305 is processed by an initial version of an acoustic model 310 for speech recognition. The speech input 305 is also used to refine a production model 315 simulating the characteristics of a specific users speech. The refined production model 315 generates additional speech data, which is used to adapt the acoustic model 320 to better recognize the user's speech. The refined acoustic model information 325 can be fed back to further refine the production model 315 and adapt the acoustic model 310. The completed acoustic model 335 can be used to receive speech input 330 from a user and to output speech recognition information 340.

Speaker Identification for Automatically Creating User Identities.

An embodiment of the invention provides higher recognition accuracy and speaker-related measures derived from speaker identification. Blind speaker identification is the process that classifies speech inputs without an explicit enrollment session.

In an embodiment, the system will allow to gradually modify a set of generic acoustic models to the characteristics of a particular speaker without enrollment.

The process starts by collecting speaker-dependent measurement from the speech input. Then it assumes about the identity of the speaker and builds the adaptation mechanism (VTLN or another warping function). Gradually, as new speech is given to the system, the estimations of such parameters are refined and the ID of the speaker is corrected. Eventually, the adaptation parameters can be used as identity parameters that could be used as a way for speaker verification.

Figure 9:
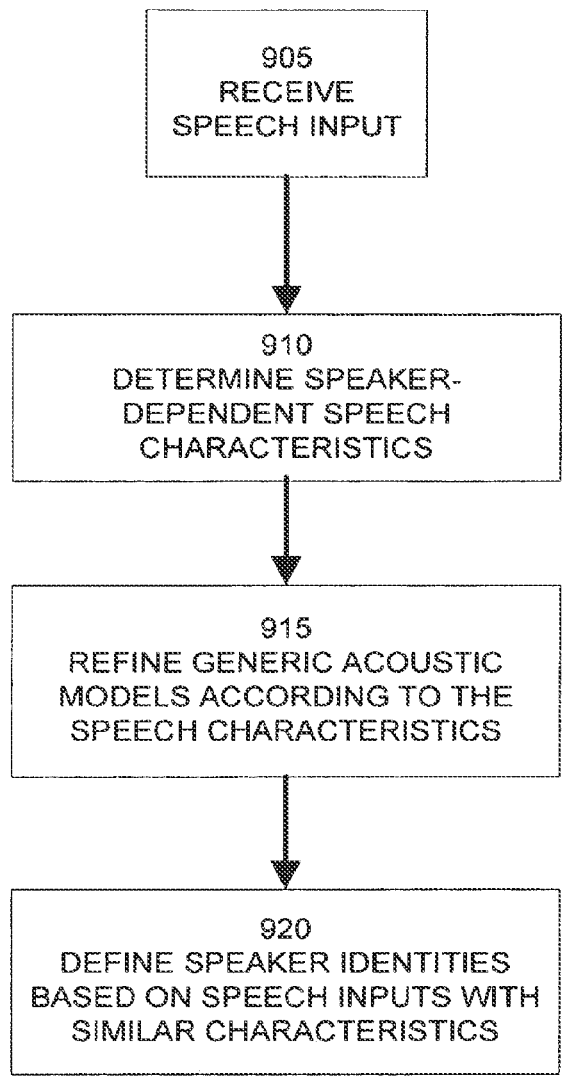
FIG. 9 illustrates a method of determining user identities using speech characteristics according to an embodiment of the invention.

FIG. 9 illustrates a method 900 for automatically creating user identities using speaker identification. Step 905 receives speech input. Step 910 determines speaker-dependent speech characteristics. Step 915 refines generic acoustic models of speakers according to the speaker-dependent speech characteristics. Step 920 defines speaker identities based on speech inputs with similar characteristics as the refined acoustic models.

User Attention-Monitoring System

An embodiment of the invention includes a system comprised of a camera and/or microphone can pause/play a videogame by detecting that attention of the player is elsewhere using head tracking and/or using a microphone to recognize if a conversation is going on.

If a user is playing a console videogame in your living room and is interrupted by a conversation or other event, or need to look away from the T.V. or need to leave the room etc, it is desirable for the game or other application to pause and save its state.

Previous applications required the user to press an escape key on the pad that brings up a menu and pauses the game. The problem with this solution is that sometimes the interruption is such that you don't get time to press the escape button.

Figure 4A:
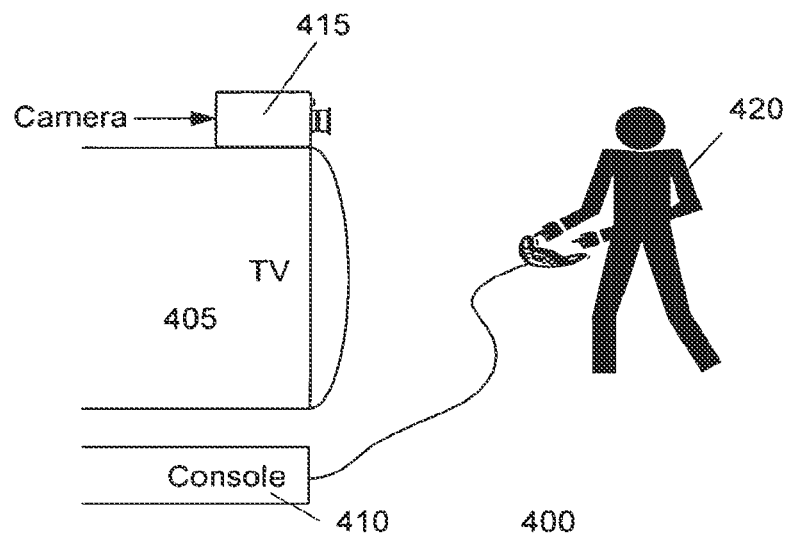
FIGS. 4A and 4B illustrate a user attention monitoring system according to an embodiment of the invention.

The benefit of proposed solution is that the user needs to take no conscious action to pause the game. FIG. 4A illustrates a user attention monitoring system 400 according to an embodiment of the invention. System 400 includes television or other display device 405, a game console 410, and a video camera 415 for monitoring a user 420.

In an embodiment, the video camera 415 attached to the system detects and tracks the user's face. Face detection tracking methods can tell if the user is not looking directly at the camera. In this embodiment, the camera may be mounted as near the T.V. or display as possible. If the detection/tracking indicate that the user is looking elsewhere or is not present, the game pauses.

Figure 4B:
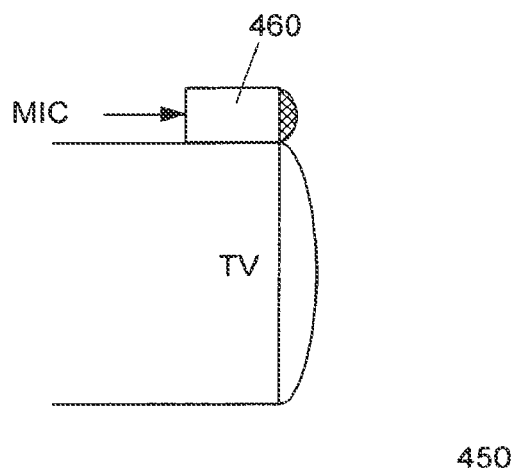

FIG. 4B illustrates a user attention monitoring system 450 according to an embodiment of the invention. In this embodiment, a microphone 460 mounted in the room can detect the presence of a conversation in the room via speech detection algorithms and acoustic analysis. If a conversation is going on for an extended period of time, the game pauses. To make system a usable product an "override and continue playing" option or preference can be included.

Pseudo-Random Speech Modification

An embodiment of the invention includes a method for enabling words in a given language can be modified in a pseudo-random manner based on a predefined pattern for entertainment purposes or generation of new words easily to be remembered, such as passwords.

The modified/generated words will include phonetic characteristics of other languages or speaking modes but trying to keep the essence of the original word for a "trans-language" artificial generation.

The method uses phoneme statistics from a language or a speaking model to modify and change the graphemes of a given word. Also, a grapheme-to-phoneme model could be used in the reverse sense to modify the graphemes of the word using the phonetic transcription in one language to change it into the phonetic sequence in another and then change it into a modified word.

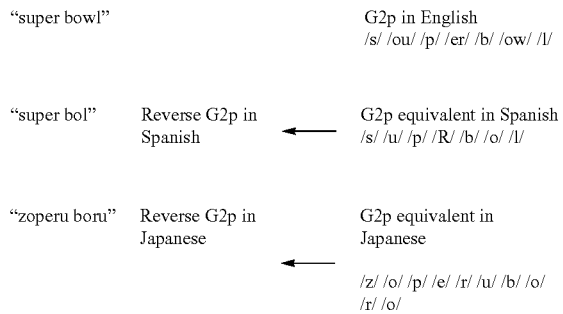

Game Controller with Integrated Power Switch

Past game systems have not had a way to power on or off remotely (probably because wired controllers were typical, requiring users to approach the game system first).

An embodiment of the invention includes a system would allow power up or down to be triggered from a controller (wireless controllers are more likely to be stored away from the game system).

The trigger mechanism could be a button or, for power up, a sensor that detects that the user is holding the controller as when they play games (e.g., holding with both hands).

Speech-Based Parental Controls

Game systems may include parental controls for blocking mature content unless a password is given. Password entry by a controller can be cumbersome if needed frequently.

An embodiment of the invention provides a voice interface for unlocking blocked content. The voice input could be used to identify a particular person (e.g., parent) or to infer from the tone of the voice that the speaker is an adult before playing mature content.

In an embodiment, the game system must be outfitted with a microphone to record the voice input. It makes use of speaker-identification algorithm trained to recognize a particular speaker, or else it uses child-detection algorithms that infer the maturity of the speaker from the tone frequency. The system may also use speech recognition algorithms to identify that a particular phrase is spoken—paraphrase or a phrase displayed to the user at detection time.

Object Tracking Using Polarized Light

An embodiment of the invention includes a system comprised of polarizing filters and a video camera to detect orientation of tracking props by measuring amount of light coming in.

Problem: Video cameras enable a more natural/physical interface as long as video analysis can capture as much information of position and orientation of the user and/or the tracking props he is holding.

Existing solutions: There are many existing tracking solutions such as color tracking on passive objects, color tracking or active (e.g., light emitting or retro reflective) objects, template matching, etc. There are specific problems with each of these.

Benefit of Proposed Solution:
Use of polarized light can be done along with any of these methods to get additional "twist" info.

Figure 5A:
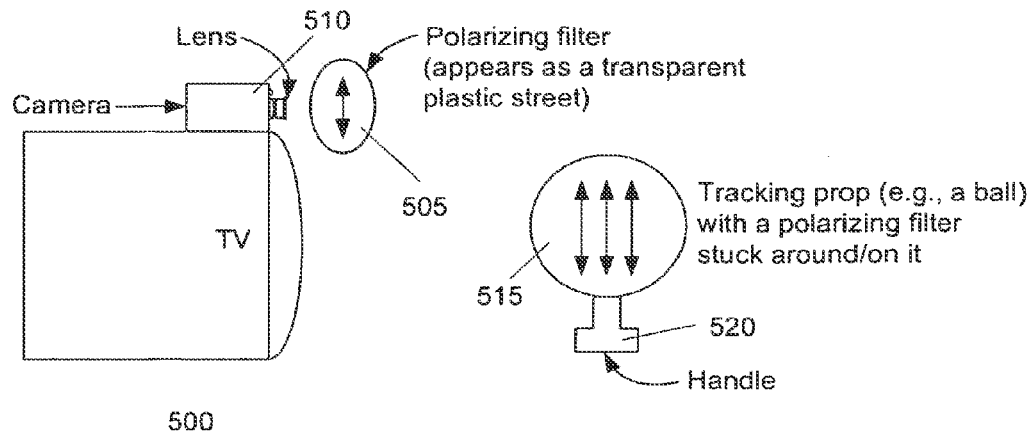
FIGS. 5A-5C illustrate a system for tracking objects using polarized light according to an embodiment of the invention.
Figure 5B:
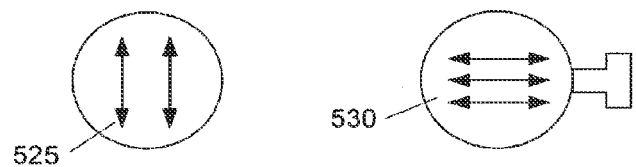

FIG. 5A illustrates a system 500 for tracking objects using polarized light according to an embodiment of the invention. System 500 includes a fixed polarizing filter 505 mounted on the camera 510 and a second polarizing filter 515 mounted on the object 520 that needs to be tracked. In this example, the object 520 appears bright because the polarization of the object 520 is aligned with that of the filter 505. FIG. 5B illustrates the application of system 500 to determine the orientation of the object. The polarization of the object 530 is perpendicular to that of the filter 525. Thus, the object 530 appears dim. This relationship between brightness and object orientation can be used to determine at least one degree of rotation from the amount of brightness of the object 530.

Figure 5C:
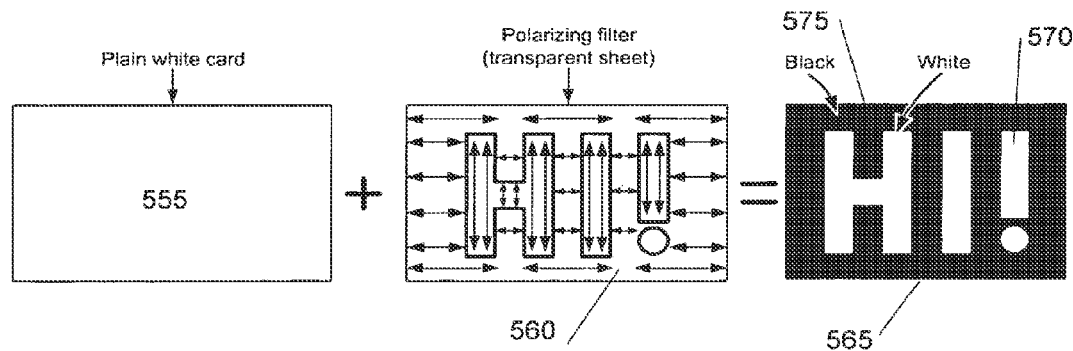

FIG. 5C illustrates another application 550 of polarization to print "hidden" messages on cards only readable by the camera. In this application, a card 555 is combined with a polarizing filter 560 with a polarization pattern. When viewed through a camera with a polarizing filter, an image 565 will include bright regions 570 where the polarization of the filter 560 is aligned with the camera's filter and dark regions 575 where the filter 560 is not aligned with the camera's filter.

Motion and Exercise Monitoring System

The current generation of fitness games have very limited means of providing useful feedback to their users on how well they perform the prescribed exercises. Part of the reason is the lack of a high-fidelity ways of acquiring human motion in real-time using simple devices (e.g., video-camera).

An embodiment of the invention uses a camera as well as a foot pressure sensing device to capture the subtleties of the user's motion in real-time (such as shifting weight from one foot to the other), anticipation of a future motion (e.g. crouching before a jump). These details would be impossible to capture using only camera input and yet they play a very important role in any fitness routine.

An embodiment of the invention includes a system to capture foot pressure data in real time. Using either sensors placed inside the shoes or a stationary pressure mat. That data will be provided to the console which, using an accurate physical model of the player, will be able to compute information such as muscle activation, joint stress, lower back stress, energy expenditures, etc. The program will be able to subsequently modify the exercise routine to better match the player's goals (such as do the exercise properly, increase the tempo, prevent injury, etc.). Alternatively, based on the information captured and computed, the application will be able to advise the user on how to improve his/her performance.

Detection and Response to User Emotions and Environment

An embodiment of the invention includes a method of using a persistent microphone to delineate between ambient music and speech to modulate the output of the game console or other device accordingly by lowering/raising volume to make more appropriate user environment.

In a real living room, the volume of a game can be controlled automatically to make the game experience more exciting using audio information to detect the level of attention of the gamer.

If the gamer makes a lot of noise means he is excited and he is enjoying the game.

The background noise is high. The volume of the game should be higher if the background noise is low. The volume of the game can be lower. If the gamer does not make any noise is attention is very low and the volume can be lower too.

Figure 6A:
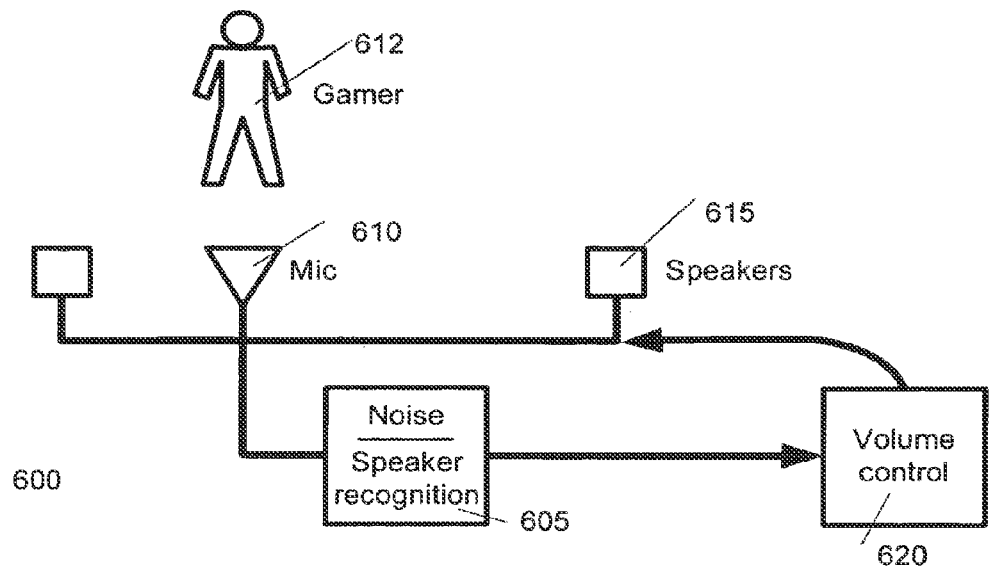
FIGS. 6A-6B illustrate a system for detecting and responding to users' emotions and their environment according to an embodiment of the invention.
Figure 6B:
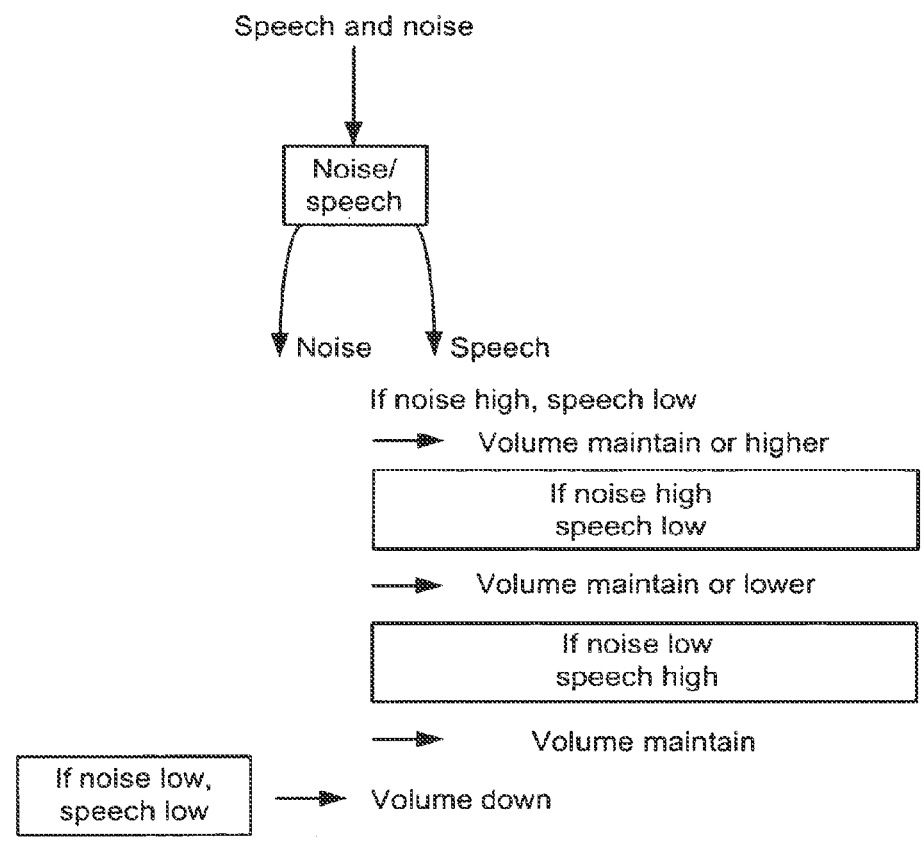

FIG. 6A illustrates a system 600 for detecting and responding to users' emotions and their environment according to an embodiment of the invention. System 600 includes a noise and speaker recognition module 605 that receives audio information from a microphone 610 include ambient noise and noise from a player or user 612. The module 605 sends a volume control signal to a volume control module 620, which in turn varies the volume of audio output by a speaker 615. FIG. 6B illustrates example behavior of the volume control module 620 in response to the relative magnitudes of speech and noise received by microphone 610.

Position Sensing Exercise System

An embodiment of the invention includes portable video game systems that can be combined with a GPS device to provide more pleasurable exercising environments. Currently, joggers and runners may use pedometers and/or other simple instruments to measure the distance they run. Conversely, portable video game systems do not leverage their ability to enable and enhance exercising.

An embodiment of the invention includes a system that can be created that combines a portable video game system (PUGS) with a GPS device or other position sensing device to provide feedback and encouragement to a player as they job/run. The system can provide challenges, for instance, by increasing (or decreasing) audio pitch or tempo to encourage the player to speed up or slow down. The system can also provide feedback such as amount of energy/calories expended as well as warning the player to take a break after a particularly tough segment.

To achieve this, the video game device would continually poll the GPS receiver. It would perform calculations such as distance over time to determine the player's speed, and change in attitude over distance to determine the terrain's steepness. This data would be used to estimate calories burned, but with much better accuracy than a pedometer could because of the additional topological data (i.e., steepness). Finally, this data could be used, as mentioned above, to encourage a player to pursue a prescribed regime, to store "high scores" on an Internet web site, and to ensure the player is not overexerting themselves.

Automatic Grammar Construction for Speech Recognition System

In a speech recognition system, it is hard to place in the grammar the acquired words through PTW. Usually, a slot in the grammar is assigned for the new word, making the placement of the new word very restrictive.

An embodiment of the invention includes a method to allow the recognition grammar to automatically place the newly acquired words onto the appropriate position in the grammar.

Figure 7:
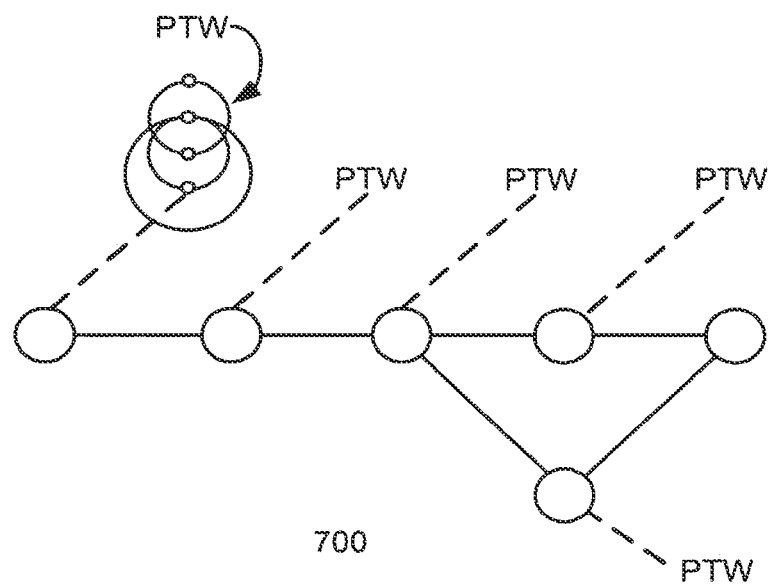
FIG. 7 illustrates a system for automatically constructing grammars for speech recognition according to an embodiment of the invention.

A phonetic typewriter (PTW) will be placed at every branching point (node) in the graph, allowing for phonetic transcription of the following word. This is treated as a "candidate word." Phoneme-to-grapheme conversion, based on a reversed G2P, can be used to validate the readable words and place them definitively in the grammar. FIG. 7 illustrates a system 700 for automatically constructing grammars for speech recognition according to an embodiment of the invention.

Figure 10:
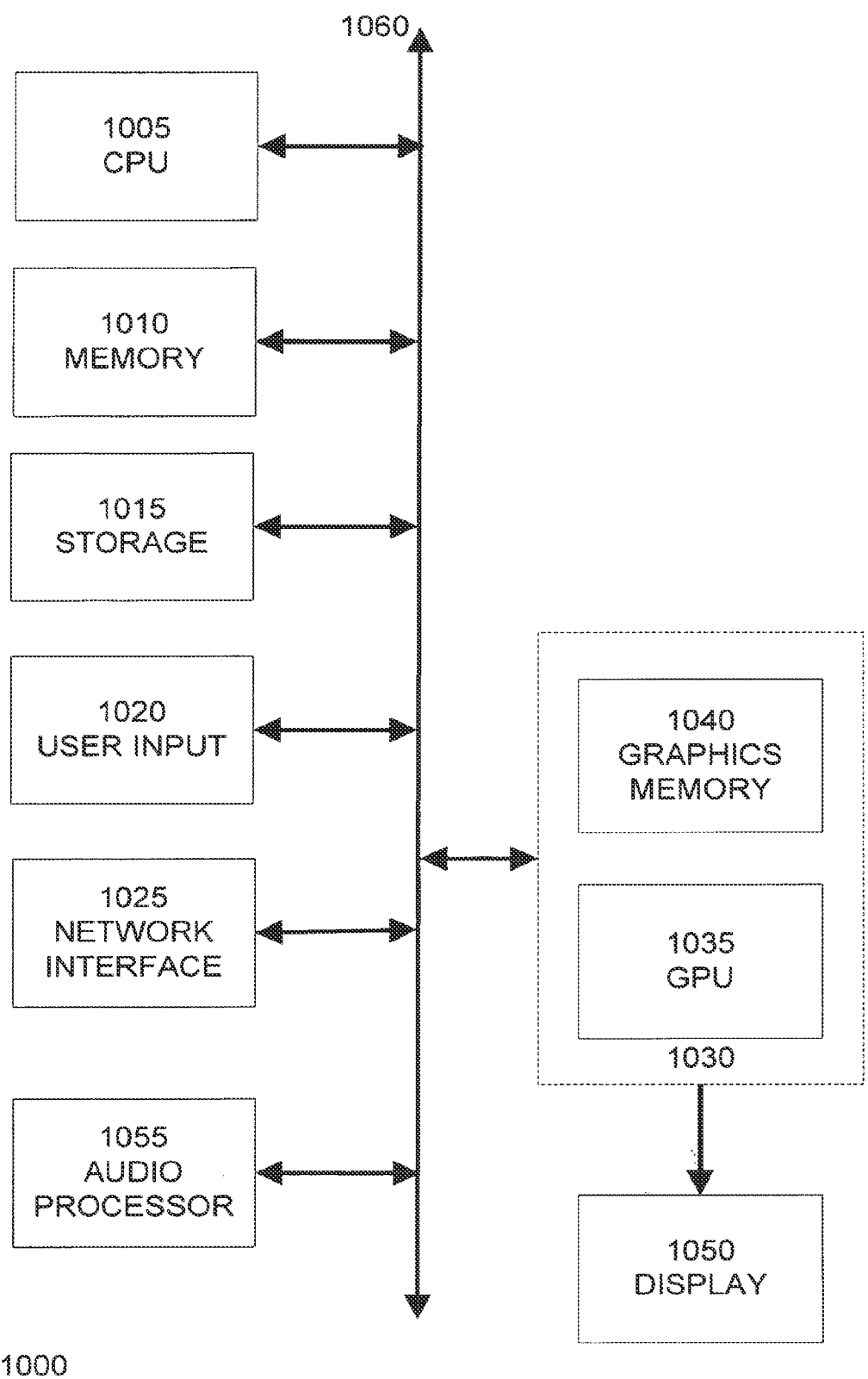
FIG. 10 illustrates a computer system suitable for implementing embodiments of the invention.

FIG. 10 illustrates an example computer system 1000 suitable for use in implementing an embodiment of the invention. FIG. 6 is a block diagram of a computer system 1000, such as a personal computer, video game console, personal digital assistant, or other digital device, suitable for practicing an embodiment of the invention. Computer system 1000 includes a central processing unit (CPU) 1005 for running software applications, implementing logic functions, and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060. In a further embodiment, a still or video camera 1065 is connected with the data buses 1060. The camera 1065 may be connected via an external interface, such as USB or Firewire interfaces, a wireless interface, or an internal interface with data buses 1065.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 11:
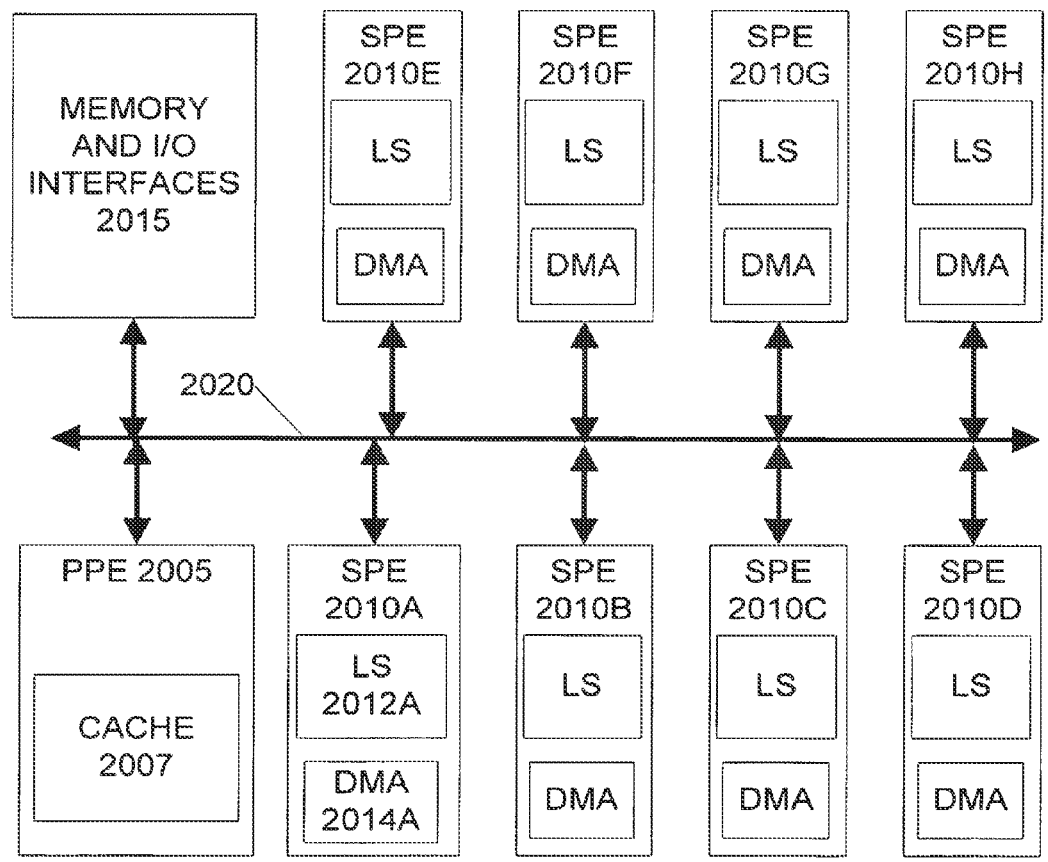
FIG. 11 illustrates a processor suitable for use with systems implementing embodiments of the invention.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 11 illustrates an example processor 2000 suitable for implementing an embodiment of the invention.

Processor 2000 includes a number of processor elements, each capable of executing independent programs in parallel. Processor 2000 includes PPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

Further embodiments of these inventions can be envisioned to one of ordinary skill in the art after reading the attached documents. Each of these paradigms can be used separately or together in any combination by portable or home video game consoles, portable or desktop personal computers, set-top boxes, audio or video consumer devices, personal digital assistants, mobile telephones, media servers, and personal audio and/or video players and recorders, and other types of electronic devices. The Applicants intends to set forth claims that cover all of these paradigms.

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
    acquiring activity data of a user located within range of one or more sensors, the one or more sensors associated with a display screen displaying video content, the displayed video content having a volume level, the activity data being in the form of one or more temporal audio or video samples;
    analyzing, using at least one processor operatively coupled with a memory, one or more of the temporal video samples to determine if the user has looked away from the display screen for a first predetermined period of time by searching successive images of the temporal video samples to detect a presence or absence of a frontal face corresponding to the user;
    analyzing one or more of the temporal audio samples to determine if the user has had an emotional response relative to the activity on the display screen for a second predetermined period of time by searching a plurality of successive subsets of the temporal audio samples having a predetermined duration to detect a presence or absence of the user's voice activity in each subset, and determining whether or not the user's voice activity is present in a predetermined consecutive number of the subsets at a volume greater than a predetermined level;
    determining that the user has looked away from the display screen for the first predetermined period of time based upon the analyzing of the one or more of the temporal video samples;
    determining that the user has not had an emotional response relative to the activity on the display screen for the second predetermined period of time based upon the analyzing of the one or more of the temporal audio samples; and
    automatically pausing the video content based upon the determining that the user has looked away from the display screen for the first predetermined period of time and based upon the determining that the user has not had an emotional response relative to the activity on the display screen for the second predetermined period of time.

2. The method of claim 1, wherein the one or more sensors include a microphone.

3. The method of claim 1, wherein the one or more sensors include a video camera.

4. The method of claim 1, wherein analyzing one or more of the temporal audio samples to determine if the user has had an emotional response relative to the activity on the display screen for the second predetermined period of time uses a noise and speaker recognition module configured to receive audio information from a microphone.

5. The method of claim 1, further comprising:
automatically adjusting the volume level of the video content based upon a determination that the user has looked away from the display screen for the first predetermined period of time.

6. The method of claim 1, further comprising:
automatically adjusting the volume level of the video content based upon a determination that the user has not had an emotional response relative to the activity on the display screen for the second predetermined period of time.

7. A system comprising:
one or more sensors configured for acquiring activity data of a user located within range of the one or more sensors associated with a display screen displaying video content, the displayed video content having a volume level, the activity data being in the form of one or more temporal audio or video samples;
a processor configured for analyzing one or more of the temporal video samples to determine if the user has looked away from the display screen for a first predetermined period of time by searching successive images of the temporal video samples to detect a presence or absence of a frontal face corresponding to the user;
the processor configured for analyzing one or more of the temporal audio samples to determine if the user has had an emotional response relative to the activity on the display screen for a second predetermined period of time by searching a plurality of successive subsets of the temporal audio samples having a predetermined duration to detect a presence or absence of the user's voice activity in each subset, and determining whether or not the user's voice activity is present in a predetermined consecutive number of the subsets at a volume greater than a predetermined level;
the processor configured for determining that the user has looked away from the display screen for the first predetermined period of time based upon the analyzing of the one or more of the temporal video samples;
the processor configured for determining that the user has not had an emotional response relative to the activity on the display screen for the second predetermined period of time based upon the analyzing of the one or more of the temporal audio samples; and
the processor configured for automatically pausing the video content based upon the determining that the user has looked away from the display screen for the first predetermined period of time and based upon the determining that the user has not had an emotional response relative to the activity on the display screen for the second predetermined period of time.

8. The system of claim 7, wherein the one or more sensors include a microphone.

9. The system of claim 7, wherein the one or more sensors include a video camera.

10. The system of claim 7, wherein the processor is configured for analyzing one or more of the temporal audio samples to determine if the user has had an emotional response relative to the activity on the display screen for the second predetermined period of time using a noise and speaker recognition module configured to receive audio information from a microphone.

11. The system of claim 7, wherein the processor is further configured for:
automatically adjusting the volume level of the video content based upon the determination by the processor that the user has looked away from the display screen for the first predetermined period of time.

12. The system of claim 7, wherein the processor is further configured for:
automatically adjusting the volume level of the video content based upon the determination by the processor that the user has not had an emotional response relative to the activity on the display screen for the second predetermined period of time.

13. A machine-readable non-transitory medium embodying information indicative of instructions for causing one or more machines to perform operations comprising:
acquiring activity data of a user located within range of one or more sensors, the one or more sensors associated with a display screen displaying video content, the displayed video content having a volume level, the activity data being in the form of one or more temporal audio or video samples;
analyzing one or more of the temporal video samples to determine if the user has looked away from the display screen for a first predetermined period of time by searching successive images of the temporal video samples to detect a presence or absence of a frontal face corresponding to the user;
analyzing one or more of the temporal audio samples to determine if the user has had an emotional response relative to the activity on the display screen for a second predetermined period of time by searching a plurality of successive subsets of the temporal audio samples having a predetermined duration to detect a presence or absence of the user's voice activity in each subset, and determining whether or not the user's voice activity is present in a predetermined consecutive number of the subsets at a volume greater than a predetermined level;
determining that the user has looked away from the display screen for the first predetermined period of time based upon the analyzing of the one or more of the temporal video samples;
determining that the user has not had an emotional response relative to the activity on the display screen for the second predetermined period of time based upon the analyzing of the one or more of the temporal audio samples; and
automatically pausing the video content based upon the determining that the user has looked away from the display screen for the first predetermined period of time and based upon the determining that the user has not had an emotional response relative to the activity on the display screen for the second predetermined period of time.

14. The medium of claim 13 wherein the one or more sensors include a microphone.

15. The medium of claim 13 wherein the one or more sensors include a video camera.

16. The medium of claim 13 wherein analyzing one or more of the temporal audio samples to determine if the user has had an emotional response relative to the activity on the display screen for the second predetermined period of time uses a noise and speaker recognition module configured to receive audio information from a microphone.

17. The medium of claim 13 further comprising instructions for:

automatically adjusting the volume level of the video content based upon the determination that the user has not had an emotional response relative to the activity on the display screen for the second predetermined period of time.

\* \* \* \* \*